United States Patent [19]

Nojiri

[11] Patent Number: 5,179,685
[45] Date of Patent: Jan. 12, 1993

[54] INFORMATION PROCESSING APPARATUS

[75] Inventor: Tohru Nojiri, Tokyo, Japan

[73] Assignee: Hitachi, Ltd., Tokyo, Japan

[21] Appl. No.: 372,696

[22] Filed: Jun. 28, 1989

[30] Foreign Application Priority Data

Jul. 1, 1988 [JP] Japan .................... 63-162624

[51] Int. Cl.$^5$ .................................. G06F 12/06
[52] U.S. Cl. ......................... 395/425; 364/DIG. 1
[58] Field of Search ... 364/200 MS File, 900 MS File; 395/400 MS File, 425 MS File

[56] References Cited

U.S. PATENT DOCUMENTS

| 4,734,852 | 3/1988 | Johnson et al. | 364/200 |
|---|---|---|---|
| 4,766,566 | 8/1988 | Chuang | 364/900 |
| 4,777,588 | 10/1988 | Case et al. | 364/200 |
| 4,833,640 | 5/1989 | Baba | 364/900 |

OTHER PUBLICATIONS

M. G. H. Katevenis "Reduced Instruction Set Computer Architecture for VLSI", The MIT Press, 1985, pp. 52-64.

Primary Examiner—Joseph L. Dixon
Assistant Examiner—Reba I. Elmore
Attorney, Agent, or Firm—Antonelli, Terry, Stout & Kraus

[57] ABSTRACT

An information processing apparatus for managing a storage such as a register file divided into a plurality of register banks. A register bank pointer is provided for each register bank in the register file so as to link the register bank to another optional register bank. The activation records for each of a plurality of tasks are allocated to the corresponding register banks in the register file. The necessary number of register banks for the allocation of the activation records for each task are linked together. The number of register banks linked together or released from the linking is changed with the increase and decrease of the number of activation records to be allocated for each task.

5 Claims, 10 Drawing Sheets

INFORMATION PROCESSING APPARATUS

BACKGROUND OF THE INVENTION

The present invention relates to an information processing apparatus having a mechanism to manage a memory device such as a register file by dividing it into a set of register banks. More particularly, the invention relates to an information processing apparatus having a storage area managing mechanism suitable for managing, during the execution of a plurality of tasks, register sets, each of which is a part of an activation record, which control the execution of a program written by a procedural language.

The method of using a register file divided into a plurality of register banks was discussed by M. G. H. Katevenis in "Reduced Instruction Set Computer Architectures for VLSI", pp. 52 to 64, The MIT Press, 1985. According to this method, an activation record is generated each time a procedure is called and has information for controlling the execution of the program, and is assigned to the register set of the activation record in a new register bank within a resiger file on a chip. A current window pointer (CWP) always designates the register bank assigned to the register set currently controlling the execution of the program. If another procedure is called during the execution of a procedure for the program, the pointer CWP takes a new value which is a remainder of a division of the current pointer value + 1 by the number of register banks. A new register set is then allocated to the register bank indicated by the new value of the pointer CWP. A plurality of register banks are cyclically allocated in the above manner.

If the nesting of procedure calls becomes deep, there occurs the case where all register banks within the register file are already used at the time of allocation of a new register set. This is called an over-flow of register file. In such a case, the content of earliest allocated register set in the register file is saved in a main storage, and the register bank to which the saved register set has been allocated is used for a new register set.

In a procedure return process (a process of returning to a calling procedure from the called procedure currently executed), the pointer CWP takes a new value which is a remainder of a division of the current pointer value − 1 by the number of register banks. Then, the register bank having controlled the execution of the program until such time is released, and the control of the program is moved to the register set indicated by the new value of the pointer CWP.

Now that the register set of the called procedure is allocated to the register bank side by side with the register bank which that of the calling procedure is allocated to.

After repetitive generation of a procedure return process, there occurs the case where the content of register set to which the control of executing the program is to be transferred is not held in the register file. This is called an under-flow of the register file. The under-flow results from saving the associated register set into the main storage. In such a case, the last saved register set is fetched from the main storage and allocated to a register bank in the register file, to thereby transfer the control of executing the program to the fetched register set.

Further, according to the above-referenced background art, all the register sets allocated to the register banks in the register file at a certain time are used for controlling the execution of a single task. Therefore, it is apparent that the register sets allocated to two contiguous register banks are related to each other as a calling and a called procedure. In a task switch process for controlling the execution of a plurality of tasks, it becomes necessary for the task switch process to temporarily save, in the main memory, all the register sets allocated to the register banks in the register file, and allocate a new register set to a register bank in the register file.

Furthermore, the above-referenced background art does not consider at all an efficient execution and management of a plurality of tasks because the register sets for only one task currently executed are held in the register file within an instruction processing unit. It becomes necessary, therefore, for the task switch to temporarily save, in the main memory, all the register sets allocated to the register banks in the register file, and fetch one of a set of register sets for a new task to be held in the register file. During such operation, the program execution is suspended.

According to the above-referenced background art which performs the management of register set allocated to the register banks in the register file, it is possible to some extent, by increasing the capacity of the register file and the number of register sets held in the register file, to reduce the occurrence frequency of over-flow and under-flow of register file, and prevent the execution performance from being degraded because of saving and restoring of the register sets relative to the main storage at the over-flow and under-flow. However, with the above method, register sets for one task only are held in the register file. And, the occurrence frequency of a task switch process is maintained unchanged. Therefore, it takes a longer time for the task switch process to save the register sets in the register file into the main storage and allocate one of the register sets of the next active process to a register bank, resulting in degrading the total execution performance.

Another background art using a register file is discussed in U.S. Pat. No. 4,775,588 entitled "General-Purpose Register File Optimized For Intraprocedural Register Allocation, Procedure Calls, and Multitasking Performance".

According to this background art, the register file is divided into two areas, i.e., a global register area and a local register area. In the global register area, a register is accessed using a register number, and in the local register area a register is accessed by an offset value from a stack pointer. In addition, it is possible to designate the block of registers accessible by a task, by using a value in a protection register. In this connection, by setting the value of each protection register for a task so as not to overlap the blocks of registers accessible by respective tasks, it becomes possible to realize access protection, store data for a plurality of tasks at the same time, and realize a task switch without data transfer between registers and a memory.

With the above-described background art, however, the block of the global registers to be accessed by using a register number by each task is determined when an object program is made. As the number of tasks increases, it eventually leads to the case where a value of a protection register for a task cannot be determined unless allowing an overlap of its block to other blocks. Therefore, the data for such tasks having the overlapped blocks of registers cannot be stored in the register file at the same time.

SUMMARY OF THE INVENTION

It is an object of the present invention to provide an information processing apparatus managing a register file within an instruction processing unit, wherein the register file has a capacity allowing allocation of register sets for a plurality of tasks, and the number of register banks to be allocated to register sets for each task is adapted to be capable of increasing or decreasing in accordance with the quantity of the register sets, independently from the register banks allocated to the register sets for other tasks.

According to the present invention, a register pointer is provided in each register bank so that the register bank can be linked to any other register bank. A linked list is formed by linking together the register banks assigned to the register sets associated with each task. The linked list of assigned register bank is called an active bank linked list. A free bank linked list is formed by linking together the register banks which are not allocated to the register sets. If the number of register banks allocated to the register sets is required to be increased, the head of the free bank linked list is selected and linked to the active bank linked list. If a register bank becomes unnecessary, the register bank is released from the active bank linked list, and linked to the free bank linked list.

According to the present invention, it is possible to hold the register sets for each of a plurality of tasks in the register bank by using the free register banks. Therefore, it becomes unnecessary to save all the register sets in the register file at the time of a task switch process, to thus considerably reducing the overhead of the task switch process. In addition, the number of register banks associated with each task can be increased or decreased. depending upon the need to increase or decrease register sets for each task, thereby considerably reducing the occurrence frequency of an over-flow and under-flow of the register file and improve the program execution performance.

Next, the constitution and operation of the present invention will be described in more detail in the following.

In the information processing apparatus according to the fundamental concept of this invention, all the register banks in the register file within an instruction processing unit are each assigned an address (bank number). The register file is divided into a plurality of register banks each having a plurality of registers. A plurality of stack frames are formed in order to execute or manage a plurality of tasks. Specifically, a set or group of activation records (each group includes all or part of the activation records of a task) constituting a stack frame for each task is arranged to be allocated to the register banks in the register file. Strictly speaking, a register bank is assigned to a register set as a part of the activation record. In executing a task, each register bank is indicated by a register bank pointer representative of the bank number to thereby manage the sequence order of the register banks allocated to the register sets.

Specifically, the value of the register bank pointer is held in a link register provided in one of two linked register banks so that the register bank pointer can indicate the other register bank. In this manner, the register banks are linked together to form a linked list. The register banks may be linked bidirectionally by the register bank pointers to form a bidirectional linked list.

A task control block is also allocated to the register bank. The task control block holds various information representing the internal state of a task such as the register bank pointers indicating the head and tail of its active banks, the bidirectional linked list allocated to the register set for the task, the address of the register set last saved in the stack frame of the main storage, global variables and the like. The data structure constructed as above for controlling the task execution is prepared for each of a plurality of tasks, and the bidirectional linked list is formed for each data structure, with the register bank for the currently executed task being located at the head of the linked list, to thereby represent a queue for the execution management of a plurality of tasks.

For allocating the register sets to the register banks, there is formed a linked list of register banks not assigned to register sets, i.e., a free bank linked list.

The operation of the constitution described above will be given. According to the present invention, a set or group of register sets associated to each of a plurality of tasks is allocated to the register banks in the register file in the instruction processing unit. Therefore, it is not necessary, as conventional, to save all the register sets in the register file at the time of a task switch process, fetch the register sets associated with a new task from the main storage, and store it into the register file. Therefore, exchange between the register sets for the new and old tasks can be carried out on the register file in a short time. In addition, since a linked list is formed by using the register bank pointers, a change of the sequence order of register banks can be dealt with flexibly.

Specifically, a queue for managing the execution of a plurality of tasks is formed such that the task control blocks for respective tasks are linked together by the register bank pointers, with the task control block for the currently executed task being located at the head thereof. The task control blocks at the head and tail of the queue for controlling the management of tasks are indicated by two pointers TQH and TQT, respectively. Therefore, a task switch process can be realized without erroneous operation only by renewing the queue for controlling the management of tasks, in accordance with the algorithm determining the priority order of task execution.

A set or group of register sets for controlling the execution of a task operates in the following manner. The lastly prepared register set is located at the head, and the register sets associated to the calling and called procedures are bidirectionally linked together by the register bank pointers indicating the register banks allocated to the two register sets, to thereby form a bidirectional linked list in which the head and tail of an active bank bidirectional linked list are indicated respectively by two pointers ARLH and ARLT held in the task control block for the task. A return from the currently executed procedure to the calling procedure is performed in the following manner. The register set having controlled the execution (i.e., the register set allocated to the register bank indicated by ARLH) is released. The value of the register bank backward pointer in the register bank allocated to the register set (i.e., the number of a register bank) is assigned to ARLH. The activation record indicated by the value of ARLH then takes care of the execution control of the program without erroneous operation. If ARLH and ARLT indicate the same register bank, then the register set to which the program execution control is transferred is saved in the main storage. And, the register, in the register bank assigned to the register set, as the information representative of a register set associated with the calling procedure holds therein an address of the register set saved in the main storage. By using this address, it is possible to restore in the register file the activation record saved into the main storage in order to transfer to the control of the calling procedure. If an over-flow of the register file occurs and the data structure for controlling the program execution of a task is required to be saved into the main storage, the register set indicated by ARLT of the task control block at the tail of the queue for controlling the execution management of the task is saved into the stack frame for the task in the main storage, to thus obtain the register bank without erroneous operation. The above state can be recognized based on the fact that the value of the free bank pointer indicating the head of the linked list of register banks not allocated to the activation records exceed the total number of register banks.

According to the information processing apparatus of this invention, in executing the programs for a plurality of tasks by an instruction processing unit having a large capacity register file, the register sets associated with each of the plurality of tasks can be held in the register file. Therefore, it becomes unnecessary, as in the conventional technology to save in the main storage all the register sets in the register file at the time of the task switch process.

In addition, the time required for the task switch process does not depend on the number of register sets in the register file. Therefore, it becomes possible to increase the number of register sets held in the register file without increasing the overhead of the task switch process, to thereby considerably reduce the frequency of occurrence of an over-flow and under-flow of the register file and the frequency of occurrence of saving the register sets into the main storage and restoring the register sets into the register file. Further, even if the task execution priority order is changed because of a task switch, the queue for the task execution management can be properly arranged only by operating upon the linked list and the queue of task control blocks in the register file, thus considerably reducing the overhead.

DESCRIPTION OF THE PREFERRED EMBODIMENT

A preferred embodiment of this invention will be described with reference to the accompanying drawings.

Figure 1:
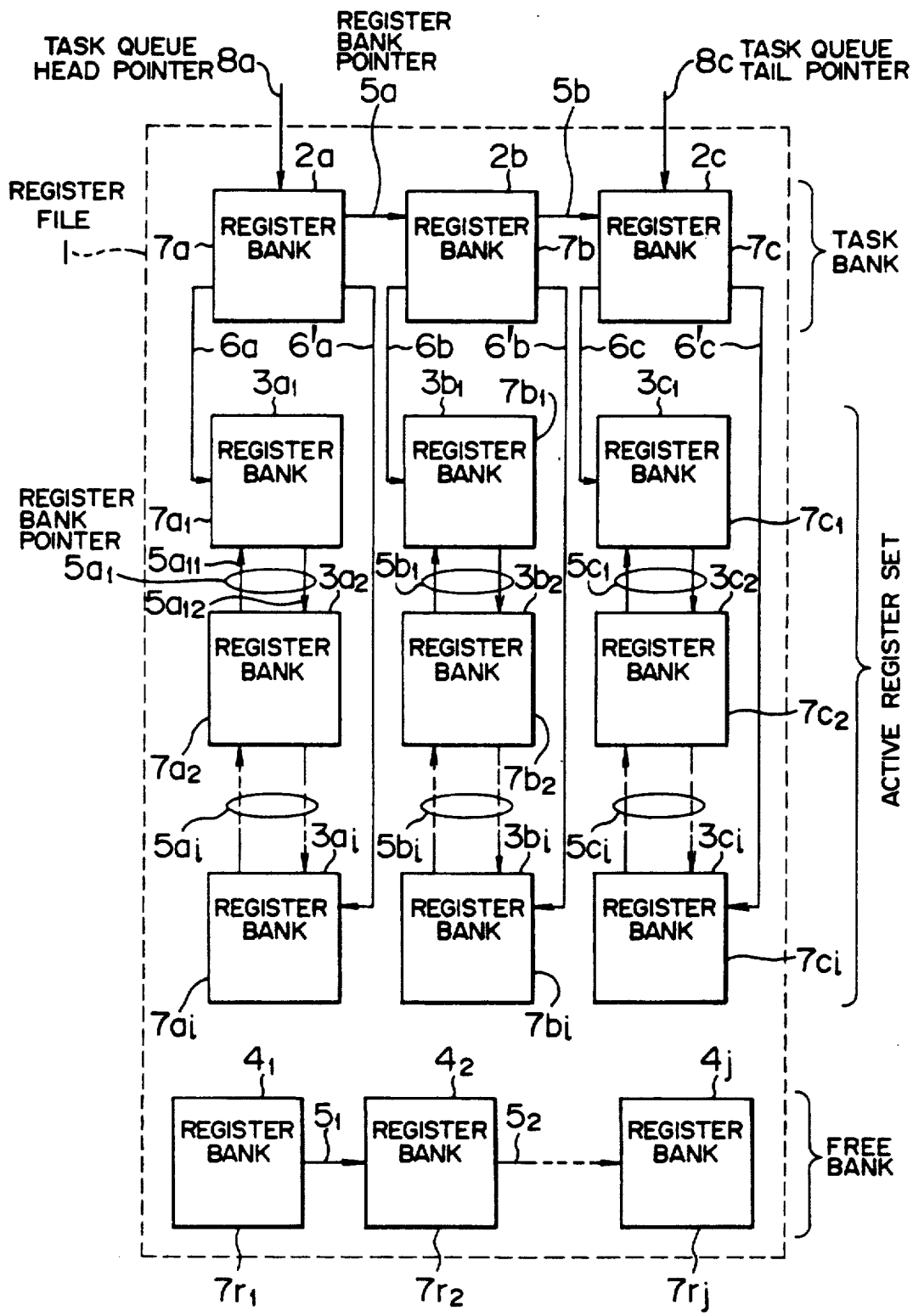
FIG. 1 is a diagram conceptually illustrating the mechanism for representing the data structure controlling the task execution by means of the register banks of the information processing apparatus of this invention, and for managing the execution of a plurality of tasks.

FIG. 1 is a diagram showing the concept of the management mechanism for a storage area according to an embodiment of this invention. Referring to FIG. 1, a register file 1 is divided into a plurality of register banks 7 (7a to 7ai, 7b to 7bi, 7c to 7ci). The register banks 7a to 7ci are assigned to task blocks 2 (2a to 2c) and register sets 3 (3al to 3ai, 3bl to 3bi, 3cl to 3ci). The register banks 7a to 7ci are linked together using register bank pointers 5 (5a to 5b, 5al to 5ai, 5bl to 5bi, 5cl to 5ci) to thereby form a data structure for controlling the execution of each of a plurality of tasks. Such a data structure is provided for a plurality of tasks (three tasks in FIG. 1) to realize a mechanism for a multiple task execution management.

In an ordinary computer system, the execution control for a plurality of tasks is carried out using a data structure constructed of task control blocks and stack frames stored in a main storage. In contrast, according to this embodiment, a task control block, register sets, each of which is a part of activation record, are held not in a main storage but in the instruction processing unit, and the register file 1 assigned with a register address space is divided into register banks 7 (7a to 7ci) in the instruction processing unit.

The register banks 7 in the register file are classified into banks 7a to 7c assigned to the task control blocks 2 for task execution management, banks 7al to 7ai, 7bl to 7bi and 7cl to 7ci assigned to the register sets 3 which are prepared upon each procedure call, and banks 7rl to 7ri or free banks 4 (4₁ to 4j) with no data assigned. Each task control block 2 holds therein the information representative of the internal condition of a task. The information includes register bank pointers representative of the head and tail of active register banks, a bidirectional linked list of each bank which is assigned to a register set, an address representative of the last saved register set in the stack frame of a main storage, global variables, and other data.

The free banks 4 are provided for an allocation process of the register set 3 or task control block 2 to the register bank 7. A free bank list is formed by linking together the free banks 4 by register bank pointers 5. In the allocation process of the register 3 or task control block 2 to the register bank 7, of head of the free bank list 4 is selected from the free bank list. In the release process of the register set 3 or task control block 2, the associated register bank 7 allocated to the register set 3 or task control block 2 is linked to the free bank list as a free bank 4.

In this embodiment, the data structure used for the execution control of task programs is constructed of a sets of register set 3 and task control blocks 2 allocated to the register banks 7 in the register file 1, sets of register sets 3 and task control blocks 2 being linked together by the register bank pointers 5 representative of the corresponding register banks 7.

A set of register sets 3 for a certain task constitutes a linked list, with the records being bidirectionally linked by register bank pointers 5.

The sequence order of the register sets 3 in the linked list is represented such that a register set associated to a calling procedure is located on the trailing end side of an arrow indicating a pointer 5, and a register set associated to a called procedure is located on the top side of an arrow indicating a pointer 5. Specifically, in the linked list shown, the backward link register bank pointer 5 (an upward pointer 5 in FIG. 1, e.g., 5a*l*) of bidirectional register pointers 5 of each register set 3 indicates a register set 3 (e.g. 3a*l*) having controlled the procedure execution until the activation record 3 (e.g., 3a2) calls a next procedure, whereas on the other hand the forward link register bank pointer 5 (a downward pointer 5 in FIG. 1, e.g., 5a*l*2) indicates an register set (e.g., 3a2) for controlling the execution of the called procedure while the procedure controlled by the register set 3 (e.g., 3a*l*) is currently executed. The head register set 3 (e.g., 3a*i*) in the linked list corresponds to the last called procedure in the task for the register set 3a*i*. During execution of this task, the register set 3a*i* located at the head of the linked list and allocated to the register bank 7 in the register file 1 is used as the means for controlling program execution at that time. Further, if a procedure is called during the execution of a task, a new register set 3 (e.g., 3a*i*+1, not shown) is prepared and allocated to the register file 1 such that the register set 3 for the task is linked to the head of the linked list of this task by the register pointers 5. The new register set 3 then controls the program execution. Furthermore, a procedure under execution of a task is caused to return to the calling procedure, the register set 3 having controlled the procedure execution for the task is released, and the register set corresponding to the calling procedure holds the register bank pointer 6.

The foregoing description has been directed to the data structure for controlling the execution of a task program, the data structure being constructed of a set of register sets 3 and task control blocks 2 allocated to the register banks 7 in the register file 1.

In an ordinary computer system, a plurality of tasks is managed in accordance with the execution priority order by providing a queue in the task control block within the main storage with a main storage address space. In contrast, in this embodiment, the data structure for controlling the execution of a task program is prepared for each task so that the queue for execution management of a plurality of tasks is realized by linking together the task control blocks 2 provided for respective tasks by the register bank pointers 5 (5*a*, 5*b* . . . ), with the currently used task control block being located at the head of the queue. The task control blocks 2 corresponding to the head (e.g., 2*a*) and tail (e.g., 2*c*) tasks in the task execution management queue are indicated by two register pointers 8 (8*a*, 8*c*).

If a task is released, or if a task execution state is changed from an execution enable state to an execution wait state, released are a set of register sets 3 and task control blocks 2 allocated to the register banks in the register file 1 and constituting the data structure used for controlling the execution of the task.

A task switch process is performed by using the queue for execution management of a plurality of tasks, in accordance with the algorithm determining the task execution priority order.

If the nesting of procedure call becomes deep, there occurs at a time of allocation of a new register set 3 the case where all the register banks 7 in the register file 1 have already been used and an over-flow may occur. In such a case, the register set 3 or task control block 2 allocated to the register bank 7 in the register file 1 are saved in the main storage (not shown) with a main storage address space, and a new register set 3 is allocated to this register bank 7 and inserted to the head of the linked list for the task so that the program execution is controlled by the new register set 3.

After repetitive generation of a procedure return process, there occurs the case where the register set 3 to which the control of executing the program is to be transferred to, in the procedure return process has no register bank 7 allocated thereto within the register file 1. This results from saving the associated register set 3 into the main storage. In such a case, the last saved register set 3 is fetched from the main storage and allocated to a register bank 7 in the register file 1. The control of executing the program is carried out by using a linked list constructed of the single fetched register set 3 for the task.

In the foregoing description, there is employed a process of saving into the main storage the register 3 or task control block 2 allocated to the register banks 7 in the register file 1. Therefore, in this embodiment, a queue for execution management of a plurality of tasks in an ordinary computer system can be constructed of a set of task control blocks allocated to the main storage and a set of task control blocks 2 allocated to the register banks 7 in the register file 1. Thus, in the task switch process in this embodiment, if the execution priority order of a plurality of tasks is changed, the queue is arranged correspondingly in association with a set of task control blocks allocated to the main storage and a set of task control blocks 2 allocated to the register banks 7 in the register file 1.

With such arrangement of the queue, upon change of the execution priority order of a plurality of tasks in the task switch process, the task control blocks saved in the main storage are fetched and allocated to the register banks 7 in the register file 1. In this case, there may occur an over-flow of the register file 1 because all the register banks in the register file 1 have already been assigned. In such a case, an register set 3 or task control block allocated to the register bank 7 in the register file 1 is saved in the main storage, and a new task control block 2 is allocated to the register bank 7 corresponding to the saved register set 3 or task control block 2. The new task control block 2 is introduced into the queue for execution management of a plurality of tasks, in accordance with the algorithm determining the task execution priority order.

According to this embodiment, the register sets 3 for controlling the program execution of à plurality of tasks at the same time can be stored in optional register banks in the register file 1. Therefore, it is not necessary to save all the register sets 3 held in the register file 1 at the time of the task switch, which might be otherwise required in the conventional technique. Therefore, during the task switch process for exchanging a plurality of tasks, it is not necessary to save the register sets 3 into the main storage, and fetch the register sets 3 from the main storage to hold them in the register file. It becomes accordingly possible to carry out the task switch accessing in only the register file, reducing the time required for the task switch process and considerably lowering the overhead. Further, according to the conventional technique, as the capacity of the register file 1 and hence the number of register sets held in the register file 1 is increased, a longer time is required for the task switch process, resulting in degrading the program execution performance. For this reason, the number of register sets 3 in the register file had been limited to a certain value. However, in this embodiment, it is possible to increase the number of register sets 3 held in the register file 1 without lowering the execution performance. Accordingly, as the capacity of the register file 1 is increased, it becomes possible to advantageously reduce the occurrence frequency of an over-flow and under-flow of the register file during the task switch process, procedure call process, and procedure return process.

Figure 2A:
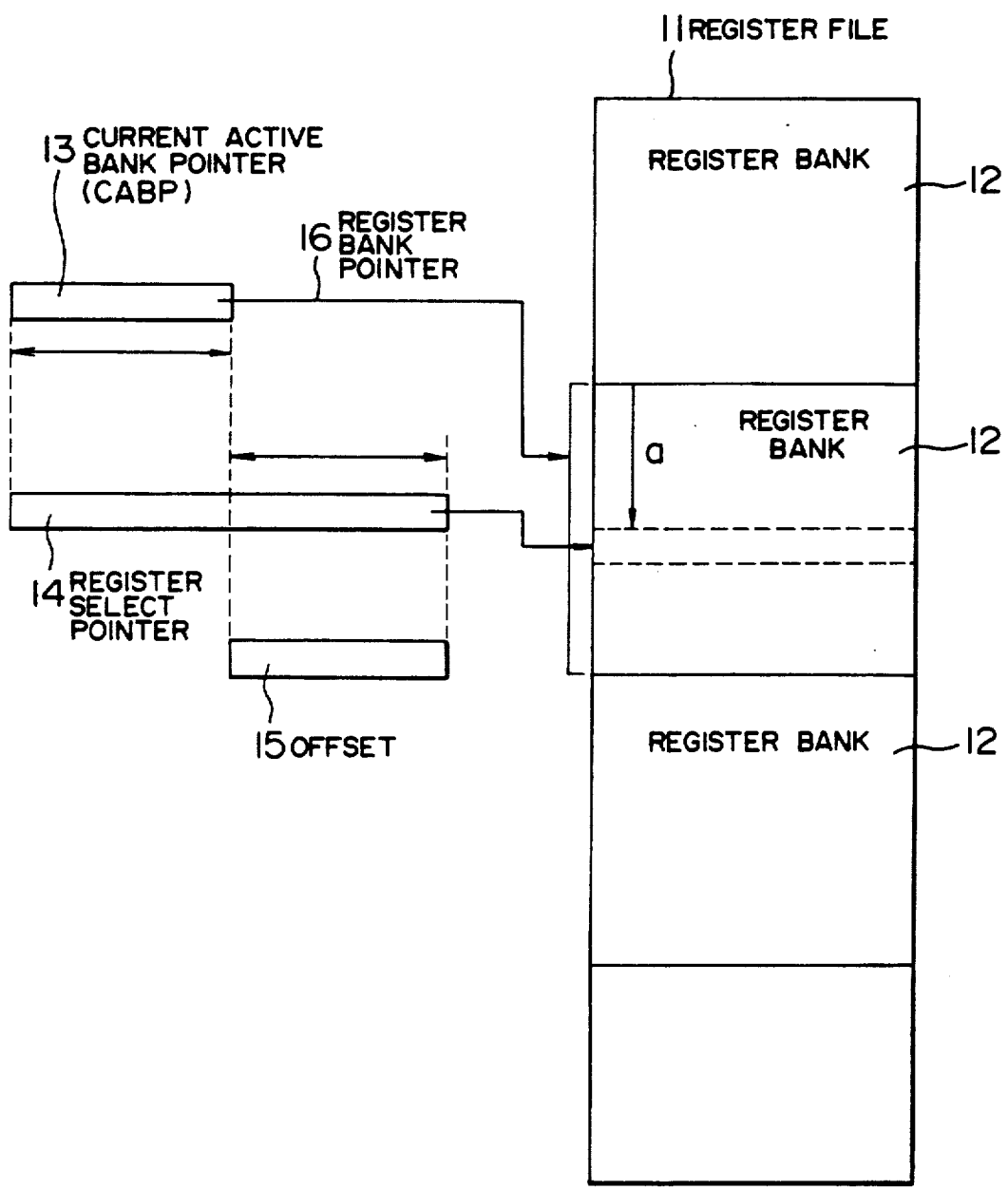
FIGS. 2a to 2c are diagrams respectively illustrating the representation format of the register bank pointer, the forming method of a linked list of register banks, and the access method to a register in a register bank, according to the present invention.
Figure 2B:
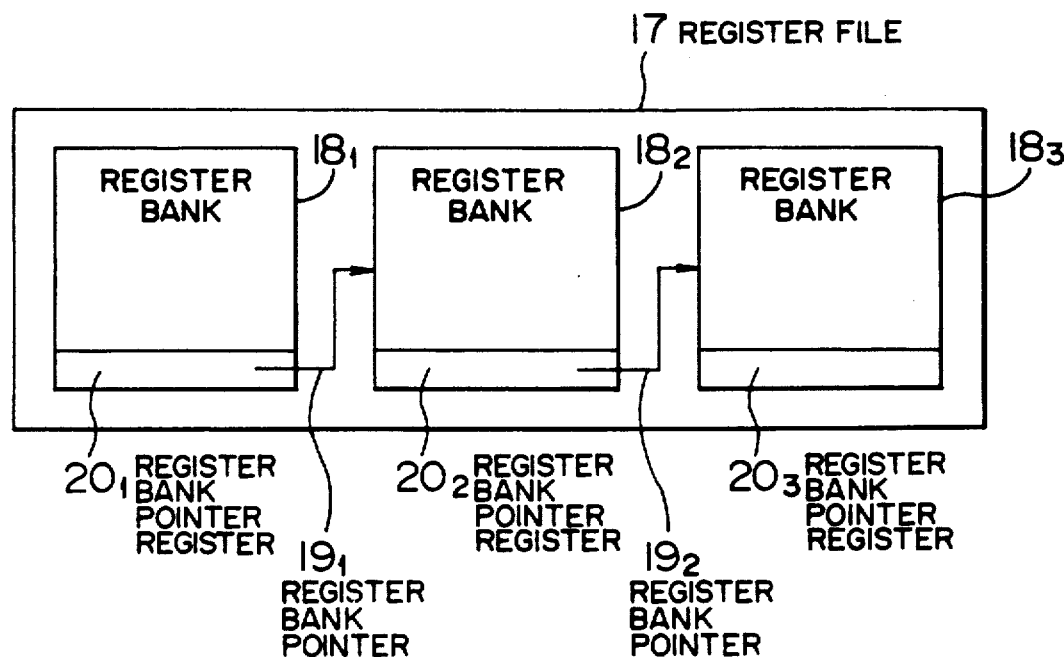
Figure 2C:
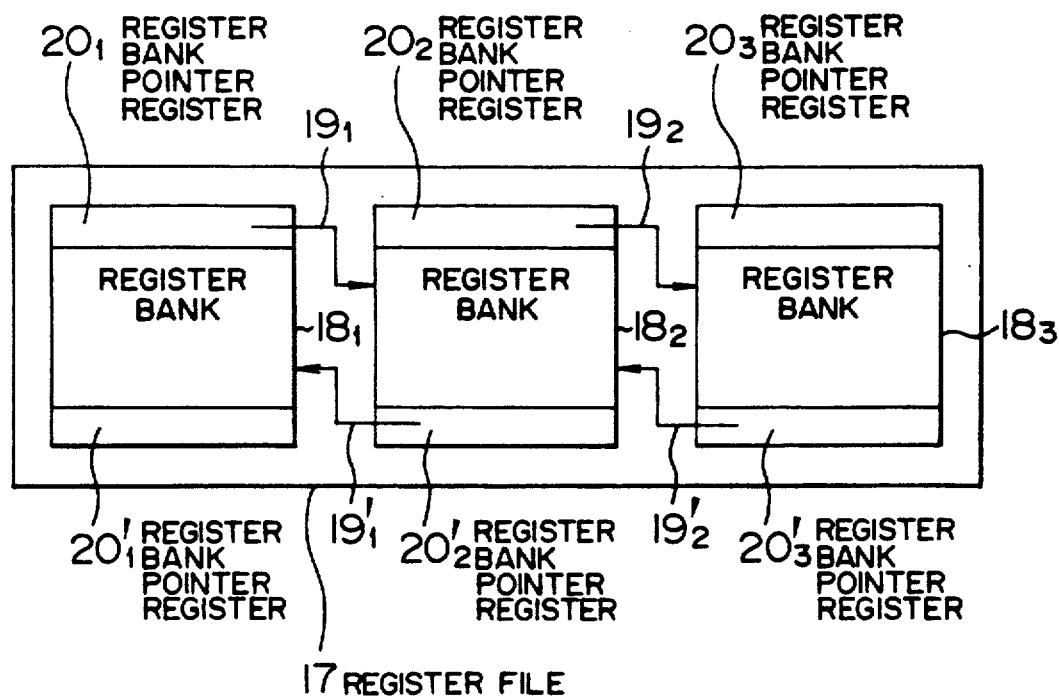

FIGS. 2a to 2c are diagrams conceptually showing the representation format of a register bank pointer 16 (corresponding to the pointer indicated at 5 in FIG. 1), the method of forming a linked list of register banks 12 (corresponding to the register banks indicated at 7 in FIG. 1) by using the register bank pointers 16, and the access method to a register in the register bank 12, respectively.

In this embodiment, the register file 12 is constructed of the n-th power of 2 (hereinafter, represented by $2 \uparrow n$) registers. Each register is assigned an address. Each register bank 12 in the register file is constructed of ($2 \uparrow m$) registers. Therefore, the total number of register banks 12 in the register file 11 is ($2 \uparrow (n-m)$). All the register banks 12 in the register file 11 are assigned bank numbers of 0 to (($2 \uparrow (n-m))-1$). The register pointer 16 indicates each register bank 12 by using the bank number. A current active bank pointer (CABP) 13 is a register bank pointer 16 indicating the currently accessed register bank 12. An intra-bank register select pointer or offset pointer 15 indicates the a-th register in the register bank 12 indicated by the pointer CABP 13. To realize such an access mechanism, according to this embodiment, an n bit register pointer 14 is generated. The upper (n−m) bits of the register pointer 14 represent the pointer CABP 13, and the lower m bits represent the m bit intra-bank select pointer 15 which indicates the a-th register in the register bank to which an access was effected upon execution of a machine language instruction. The value of the pointer 14 therefore indicates the address of the register to be accessed in the register file 11.

FIG. 2b shows a linked list of the register banks 18 ($18_1$, $18_2$, $18_3$) linked together by the register bank pointers 19 ($19_1$, $19_2$) Each register bank 18 in the register file 17 has a register bank pointer register 20 ($20_1$, $20_2$, $20_3$) storing the register bank pointer 19 ($19_1$, $19_2$). The register bank 18 (e.g., $18_1$) holds the register bank pointer 19 (e.g., $19_1$) of the register bank 18 ($18_2$) in the register bank pointer register 20 (e.g., $20_1$) so that the two register banks 18 ($18_1$, $18_2$) are linked together. One (e.g., $18_1$) of the two linked register banks 18 holds the register bank pointer 19 (e.g., $19_1$) of the other register bank (e.g., $18_2$), to thereby indicate the sequence order of the two linked register banks 18.

FIG. 2c shows a linked list of the register banks 18 ($18_1$, $18_2$, $18_3$) bidirectionally linked together by the register bank pointers 19, 19' ($19_1$, $19_2$, $19'_1$, $19'_2$). Each register bank 18 in the register file 17 has two register bank pointer registers 20, 20' ($20_1$, $20_2$, $20_3$, $20'_1$, $20'_2$, $20'_3$) holding the register bank pointers 19, 19'. The one register bank pointer 19 indicates the register bank 18 logically contiguous in the forward direction (to the right in FIG. 2c) within the linked list, whereas the other register bank pointer 19' indicates the register bank 18 logically contiguous in the backward direction (to the left) within the linked list. The sequence order of the two linked register banks is determined based on whether the register bank is nearer to the head (the left side) or to the tail (the right side).

In this embodiment, each register bank 12 is assigned a number in accordance with the address given to the register file 11 to represent the register bank pointer 16 by using the assigned number. Therefore, a mechanism for indicating a register to be accessed in the register file 11 can be realized easily, by using the value of the register bank pointer 16 indicating the register bank 12 to be accessed and the value of the intra-bank register select pointer 15.

Further, the sequence order of a plurality of register banks 18 can be represented by forming the linked list of the register banks 18 linked together by the register bank pointers 19 as shown in FIGS. 2b and 2c, thus allowing a flexible management of the linked list when the sequence order of the register banks 18 is changed.

Figure 3:
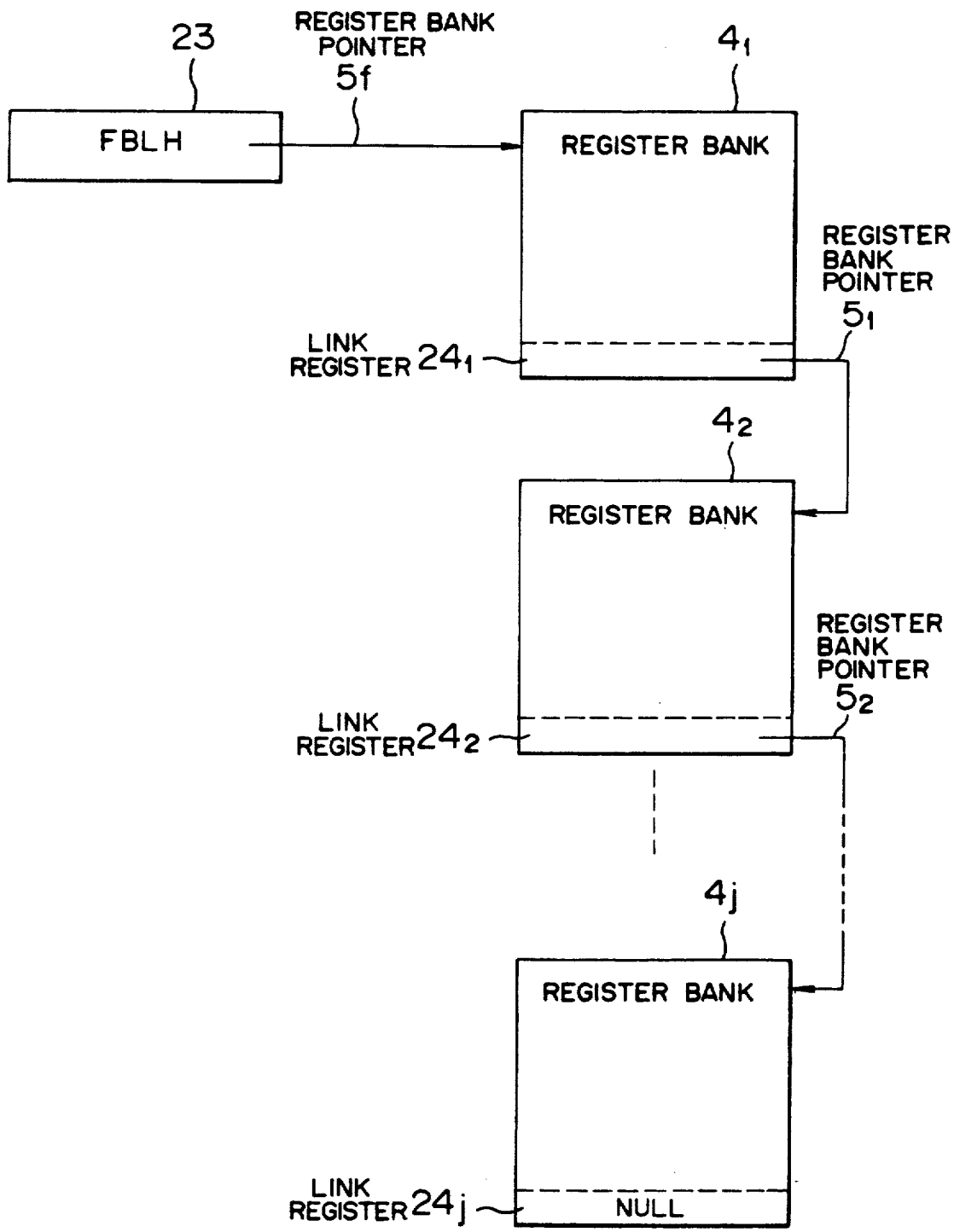
FIG. 3 is a diagram showing the management mechanism for free banks according to the present invention.

FIG. 3 is a diagram conceptually showing the management mechanism of the free banks 21 (corresponding to the free banks 4 in FIG. 1).

Each free bank 4 ($4_1$, $4_2$, ..., $4_j$) has a link register 24 ($24_1$, $24_2$, ..., $24_j$) storing a register bank pointer 5 ($5_1$, $5_2$, ...) for forming a linked list. The link register $24_j$ of the free bank $4_j$ located at the tail of the linked list is set as an invalid (null) value at a value in excess of all the numbers assigned to the register banks in the register file, i.e., a value equal to or larger than ($2 \uparrow (n-m)$). A free bank list head register (FBLH) 23 stores a register bank pointer $5_f$ indicating the free bank $4_1$ at the head of the linked list of the free banks 4.

In allocating a register set or task control block to the register bank, the free bank $4_1$ indicated by the free bank list head register 23 is separated from the linked list, and the separated free bank $4_1$ is used for the process. In this case, the free bank list head register 23 takes the value $4_2$ which has been held in the link register $24_1$ of the free bank $4_1$ indicated by the free bank list head register 23. If the free bank $4_j$ at the tail of the linked list is separated, the free bank link head register 23 takes the value in excess of all the numbers of the register banks in the register file, i.e., the value equal to or larger than ($2 \uparrow (n-m)$). Therefore, in the process of separating the free bank 4 from the linked list, if the free bank list head register 23 takes a value equal to or larger than ($2 \uparrow (n-m)$), it means that an over-flow of the register file has occurred. For the operation such as allocation of a register set to a register bank, release of a register bank, provision of a register bank to the linked list, or separation of a register bank from the linked list, the register bank is selected by an execution control unit 63 of an information processing apparatus 60 shown in FIG. 6, based on the value stored in a bank pointer register 68.

According to this embodiment, the allocation process for a register bank can be realized by changing the value in the free bank list head register 23. In addition, whether or not a free bank is present in the register file can be checked based on whether the value of the free bank list head register 23 takes a value equal to or larger than $(2 \uparrow (n-m))$.

Figure 4:
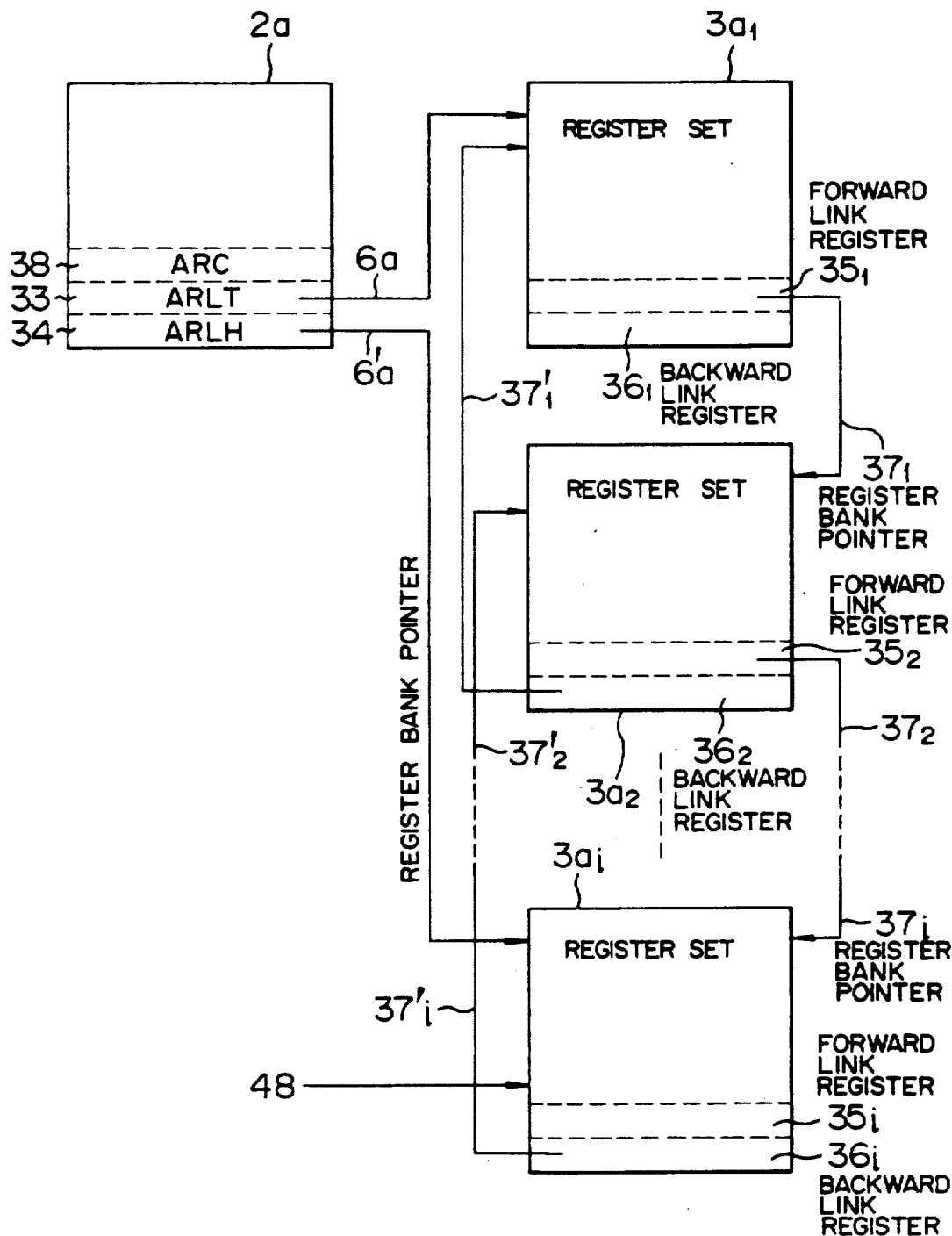
FIG. 4 is a diagram illustrating the data structure constructed of a task control block for controlling the execution of a task, and register sets, according to the present invention.

FIG. 4 shows the data structure constructed of a task control block 2a for controlling the execution of each task, and register sets 3a (3a1, 3a2, ..., 3ai).

Each of a set of register sets 3a for controlling the execution of a task has two registers, i.e., a forward link register 35 ($35_1$, $35_2$, ..., $35_i$) and a backward link register 36 ($36_1$, $36_2$, ..., $36_i$). The forward link register 35 stores a register bank pointer 37 ($37_1$, $37_2$, ..., $37_i$) of the register set 3a logically contiguous in the forward direction (downward direction in FIG. 4), and the backward link register 36 stores a register bank pointer 37 ($37'_1$, $37'_2$, ..., $37'_i$) of the register set 3a logically contiguous in the backward direction (upward direction in FIG. 4), to thereby form the bidirectional linked list. An active register bank link head (ARLH) register 34 and active register bank link tail (ARLT) register 33 in the task control block 2a store register bank pointers 6'a and 6a indicating the head and tail register sets 3a in the linked list. The register set 3ai for controlling the execution of a task is indicated by a register CACR 48 shown in FIG. 5.

A register set 3a (e.g., 3ai+1, not shown) newly generated at a procedure call is introduced in front of the register set 3a (e.g., 3ai) indicated by the register ARLH 34 in the linked list. Therefore, the backward link register 36 (36i+1, not shown) of the new register set 3a is set at the value of the pointer 6'a having been stored in the register ARLH 34 (i.e., the value the register bank number assigned to the register set 3ai). The forward link register 35i of the register set 3ai having been indicated by the register ARLH 34 is set at the value of the register pointer 37i+1 (not shown) indicating the register bank allocated to the new register set 3ai+1. This set value is also set at the register ARLH 34.

In order to carry out a return process from a currently executed procedure to the calling procedure, the register set indicated by the register ARLH 34 is released, and the value (register set 3ai−1) of the backward link register 36i of the register set 3ai indicated by the register ARLH 34 is set at the register ARLH 34. If the register set 3ai to be released is the register set 3ai indicated by the register ARLT 33, it means that the register set 3ai−1 to be released was saved in the main memory. It is therefore necessary to fetch the saved register set 3ai−1, i.e. 3a0 into the register file. The address of the saved register set is held in the backward link register 36i of the register set 3ai indicated by the ARLT 33.

If an over-flow occurs and the data structure for controlling the execution of a task is requested to be saved in the main memory, the single register set 3ai (e.g., 3al) indicated by the register ARLT 33 is saved in the main storage. The destination address of the main storage is calculated based on the value of the backward link register $36_1$ of the register set 3al. After saving the register set 3al into the main storage, the register ARLT 33 is set at the value (3a2) stored in the forward link register $35_1$ of the saved register set 3ai. The backward link register $36_2$ of the register set 3a2 indicated by the new value of the register ARLT 33 is set at the calculated address in the main storage of the saved register set 3al. There occurs the case where after saving the register set 3a in the main storage, the data structure stored in the register file for controlling the task execution is only the task control block 2a. To deal with such a case, the task control block 2a stored in the register file has an active register bank counter register 38 indicating the number of register sets 3a for the task. If a task whose program execution is controlled by the data structure requested to be saved in the main storage has no register set 3a in the register file, i.e., if the value of the register ARC 38 in the associated task control block 2a is 0, then the task control block of this task is saved in the main storage (the process for saving the task control block 2a into the main storage will be detailed with reference to FIG. 5).

According to this embodiment, task program execution can be efficiently controlled by using the task control block 2a and a set of register sets 3a allocated to the register banks in the register file.

Figure 5:
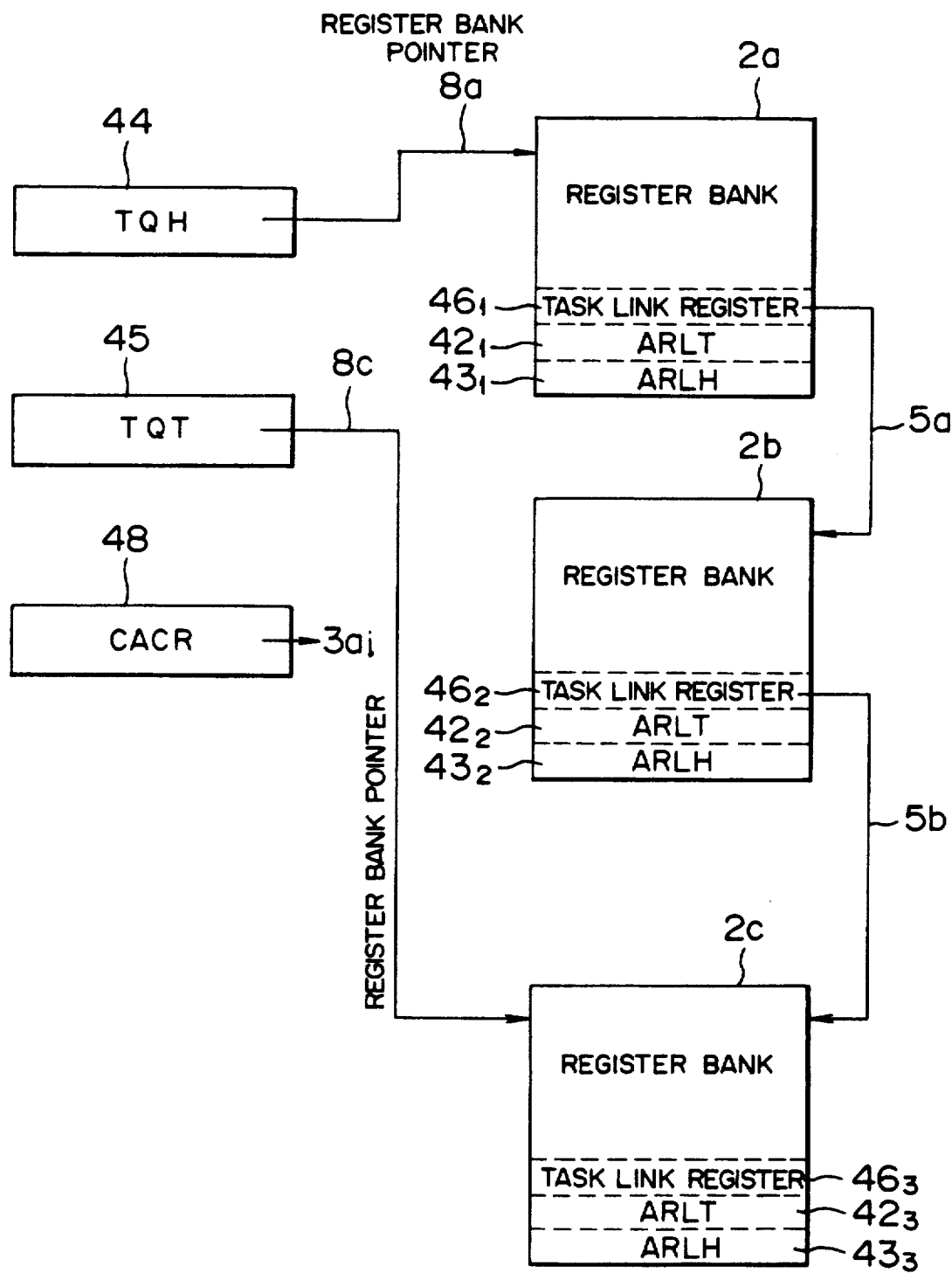
FIG. 5 is a diagram conceptually illustrating the management method for a task execution queue by using a linked list of task control blocks according to the present invention.

FIG. 5 is a diagram conceptually illustrating the task execution queue management method by using the linked list of the task control blocks 2a (corresponding to the task control blocks 2 in FIG. 1) linked together by the register bank pointers 8a.

Each task control block 2 (2a, 2b, 2c) held in the register file manages executable tasks, and has a task link register 46 ($46_1$, $46_2$, $46_3$) storing a register bank pointer 5 (5a, 5b, 5c) indicating the other task control block 2 (2a, 2b, 2c), to thereby link the task control blocks and form the linked list. The sequence order of the task control blocks 2 represented by the linked list indicates the priority order of tasks under management of the task control blocks 2. Two registers TQH 44 and TQT 45 respectively indicate the task control blocks 2a and 2c located at the head (uppermost in FIG. 5) and tail (lowermost in FIG. 5) of the linked list of the task control blocks 2 in the register file. The head task control block 2a manages the task currently executed.

Stored in the register CACR 48 is the value of the register ARLT 43i of the register set 3ai at the register bank linked backwardly of the register bank at the task control block 2a indicated by the register TQH 44. The register CACR 48 has the function of the pointer CAPB shown in FIG. 2, and efficiently accesses the register set for controlling the currently executed program.

If an over-flow of the register file occurs and the data structure for controlling the program execution of a task is requested to be saved in the main storage, there occurs the case where not only register sets but also a task control block 2 respectively allocated to the register banks in the register file are requested to be saved in the main storage. In view of this, according to this embodiment, the queue for execution management of a plurality of tasks is constructed of a set of task control blocks allocated to the main storage and a set of task control blocks 2 allocated to the register banks of the register file. The set of task control blocks allocated to the main storage is also provided with a queue in accordance with the task execution priority order. In this embodiment, the queue for the task control blocks allocated to the main storage is assumed to be linked backwardly of the linked list of the task control blocks stored in the register file.

To this end, a task link register 46 ($46_1$, $46_2$, $46_3$) is provided in this embodiment for each task control block. The task link register $46_3$ of the task control block 2c (located at the tail of the linked list of the task control blocks 2a to 2c) in the register file indicated by the register TQT 45 stores therein an address of the queue for the task control blocks allocated to the main storage. In other words, the task control blocks 2 stored in the register file for controlling task execution have a higher priority than that of the task control blocks stored in the main storage.

If a task under execution management by the task control block in the register file changes its state from an execution enable state to an execution suspended state, the task control block is separated from the linked list which manages the task execution queue. The separated task control block is transferred to a data base which manages the suspended tasks. The register bank having been allocated to the suspended control block is released.

If a task changes its state from the execution suspended state to the execution enable state, the task control block for managing the execution of this task is introduced into the task execution queue. In this case, depending upon the task execution priority order, the task control block becomes either the task control block 2 allocated to the register file or the task control block allocated to the main storage.

In the case of the task control block to be allocated to the register file, the task control block is fetched into the register file and allocated to the register bank, and introduced into the linked list for managing the task execution queue.

In the case where a task execution priority order changes upon a task switch process, if the change is between the tasks managed by the task control blocks 2 held in the register file, then it is sufficient for the task switch process only to change the linked list of the register file managing the task execution queue. However, if the change is not between the tasks managed by the task control blocks 2 in the register file, then depending upon the task execution priority order, the task control block for managing the task becomes either the task control block 2 allocated to the main storage from the register file or the task control block 2 allocated to the register file from the main storage. Performed during such an operation are a saving process of the task control block 2 held in the register file into the main storage, fetching the task control block from the main storage into the register file, and the allocation and release processes of the register bank.

According to this embodiment, the execution queue for a plurality of tasks can be managed by using the linked list of the task control blocks 2 in the register file, and the register set for controlling the concurrent execution of programs of a plurality of tasks can be stored in the register file. Therefore, it is not necessary to save all the register sets held in the register file at the time of a task switch process into the main storage, which might otherwise be requested in the conventional technique. Thus, an overhead of a task switch process can be considerably reduced.

Figure 6:
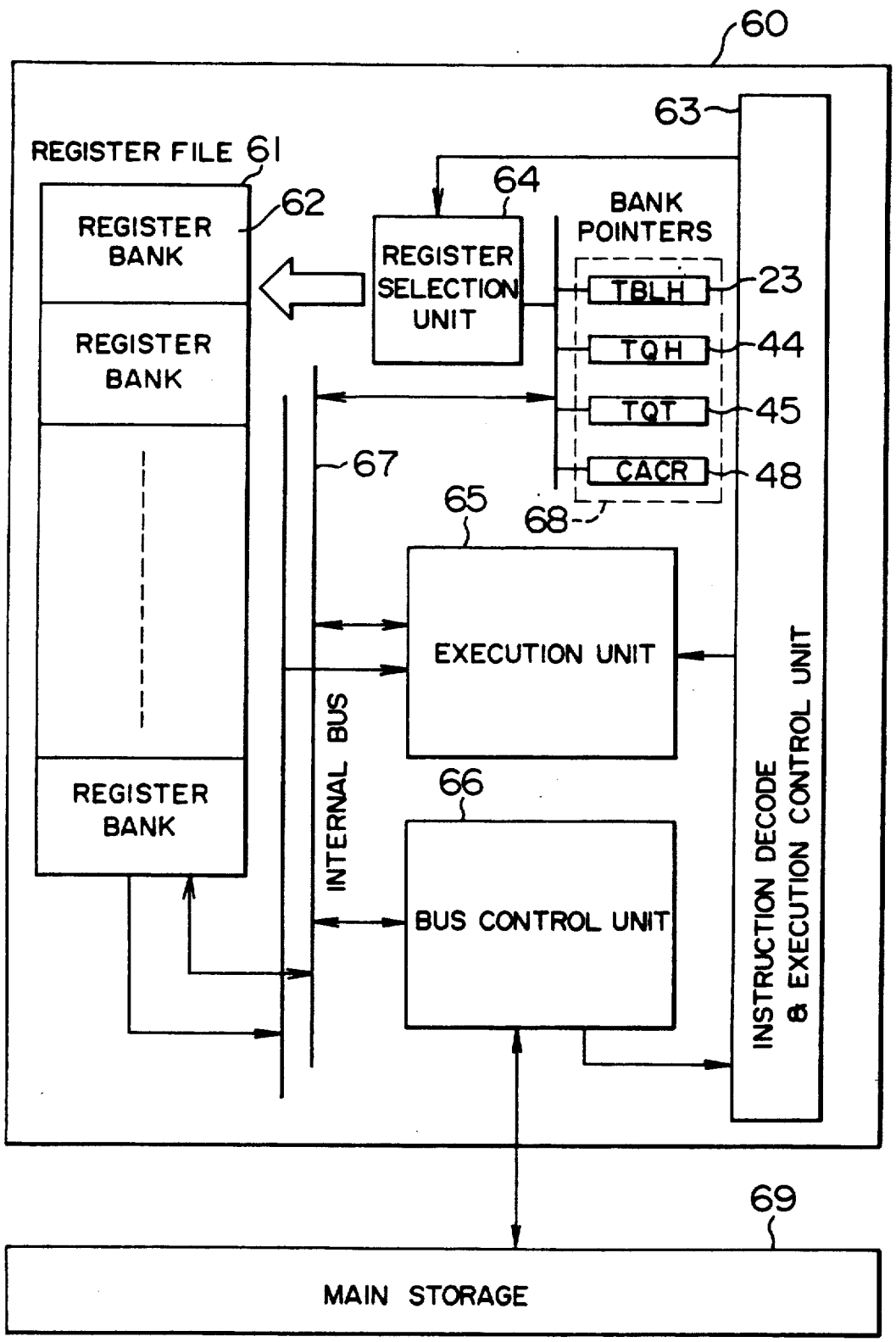
FIG. 6 is a block diagram showing an embodiment of the information processing apparatus including a register file which is managed by dividing it into a plurality of register banks, according to the present invention.

FIG. 6 is a block diagram showing an embodiment of an information processing apparatus 60 with a register file 61 managed by dividing it into a plurality of register banks 62 for performing various processes described above.

The information processing apparatus is constructed of an instruction decode and execution control unit 63, instruction execution unit 65, bus control unit 66, register file 61, bank pointers 68, register selection unit 64, internal bus 67 and main storage 69.

The instruction execution unit 65, bus control unit 66, register file 61 and bank pointers 68 transfer data via the internal bus. The bank pointers 68 include the free bank register 23, registers TQH 44 and TQT 45 and register CACR 48, respectively described previously.

The bus control unit 66 includes therein control registers such as an address register, data input/output register to thereby read an instruction from the main storage, transfer data to and from the main storage, and access an external bus.

The instruction decode and execution control unit 63 decodes an instruction fetched via the bus control unit 66 and controls the respective units in the information processing unit 60 in accordance with the decoded instruction.

The execution unit 65 fetches data either from the internal bus 67 or from the instruction decode and execution control unit 63, and calculates the data to send the result to another unit via the internal bus 67.

The register selection unit 64 generates a register selection signal for selecting one register in the register file 61, based on the value of the bank pointer 68 indicated by the instruction decode and execution control unit 63 and the value sent from the instruction decode and execution control unit 63.

The register file 61 transfers via the internal bus the data of the register indicated by the register selection signal.

In allocating a register set to a register bank, the register selection unit 64 generates a signal for selecting a free bank 4i shown in FIG. 3 in the register file 61, by using the value stored in the free bank register 23 of the bank pointers 68. The execution unit 65 makes the free bank 4i separate from the linked list, and allocates the register set to the register bank. The execution unit 65 then links the register bank forwardly of the register set 3ai in the register file, by using a signal generated by the register selection unit 64 based on the value stored in the register CACR 48, and the contents of the register CACR 48 are rewritten.

In performing a return process from the currently executed procedure, the instruction execution unit 65 releases the register set 3ai from the linked list in accordance with the value stored in the register CACR 48, and links the register bank having been allocated to this register set to the linked list of the free banks in accordance with the value stored in the free bank register 23. In this case, if the activation record 3ai to be released is located at the tail of the linked list, the instruction execution unit 68 reads the register set saved in the main storage 69 by using the contents of the backward link register in the register set, separates the free register bank from the linked list by using the value stored in the free bank register 23, and allocates the read-out register set to the separated register bank.

If an over-flow of the register file occurs, the instruction execution unit 65 saves into the main storage the register set indicated by the register ARLT 33 among the register set 2a (shown in FIGS. 4 and 5) generated in accordance with the contents of the register TQH 44.

In switching a task to be executed, by using the head and tail queue addresses of the task control blocks (shown in FIG. 5) generated in accordance with the contents of the registers TQH 44 and TQT 45, the instruction execution unit 65 links the head task control block backwardly of the tail task control block in the register file, links the task control block of the new task to the head control block, respectively in accordance with the queue of the task control blocks, and changes the contents of the registers TQH 44 and TQT 45.

Figure 7:
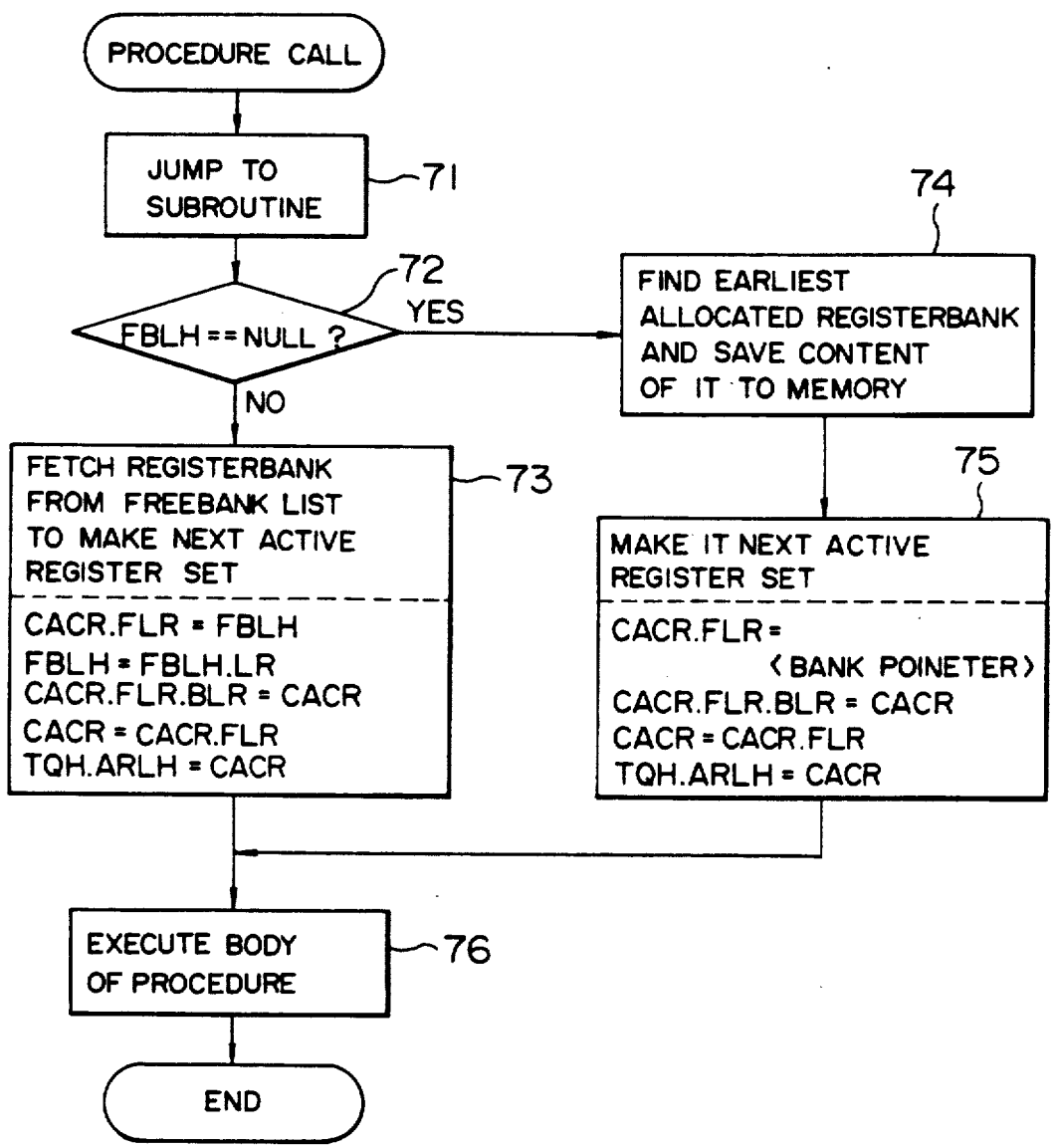
FIG. 7 is a flow chart showing the sequence of a procedure call process by the information processing apparatus including a register file which is managed by dividing it into a plurality of register banks, according to the present invention.

FIG. 7 is a flow chart showing the sequence of a procedure call carried out by the embodiment of the information apparatus with a register file managed by dividing it into a plurality of register banks.

In accordance with an execution control signal generated by the instruction decode and execution control unit based on the sub-routine jump instruction read via the bus control unit, the following processes are performed.

First, a sub-routine jump process as performed by an ordinary information processing apparatus is conducted (step 71). Then, prior to the allocation of a new resister set, it is checked if a free bank is present in the register file, in accordance with FBLH= =Null? (step 72). If NO, there is a free bank, and if YES, there is no free bank.

If a free bank is present, one free bank is selected in accordance with the free bank list, and the selected free bank is allocated as the new register set used for controlling the procedure execution (step 73). "." represents an operator. CACR.FLR indicates the FLR field of the register bank indicated by CACR. CACR.FLR.BLR indicates the BLR field of the register bank indicated by CACR.FLR, in accordance with the equivalent (CACR.FLR).BLR according to the calculation order.

If a free bank is not present, in order to obtain a new register bank, the contents of the earliest allocated register bank are saved into the memory (step 74). Thereafter, the register bank is allocated as the new register set used for controlling the procedure execution (step 75).

After allocating the new register set used for controlling the procedure execution, the procedure body is executed in the similar manner as an ordinary information processing apparatus (step 76).

According to the conventional technique, it is necessary for data saving and restoring to transfer data between the memory and register file during the procedure call process. However, according to this invention, the procedure call process can be realized only by the process associated with a register bank pointer such as managing the bank list according to which the register set is allocated, to thereby considerably improve the efficiency of the apparatus.

Figure 8:
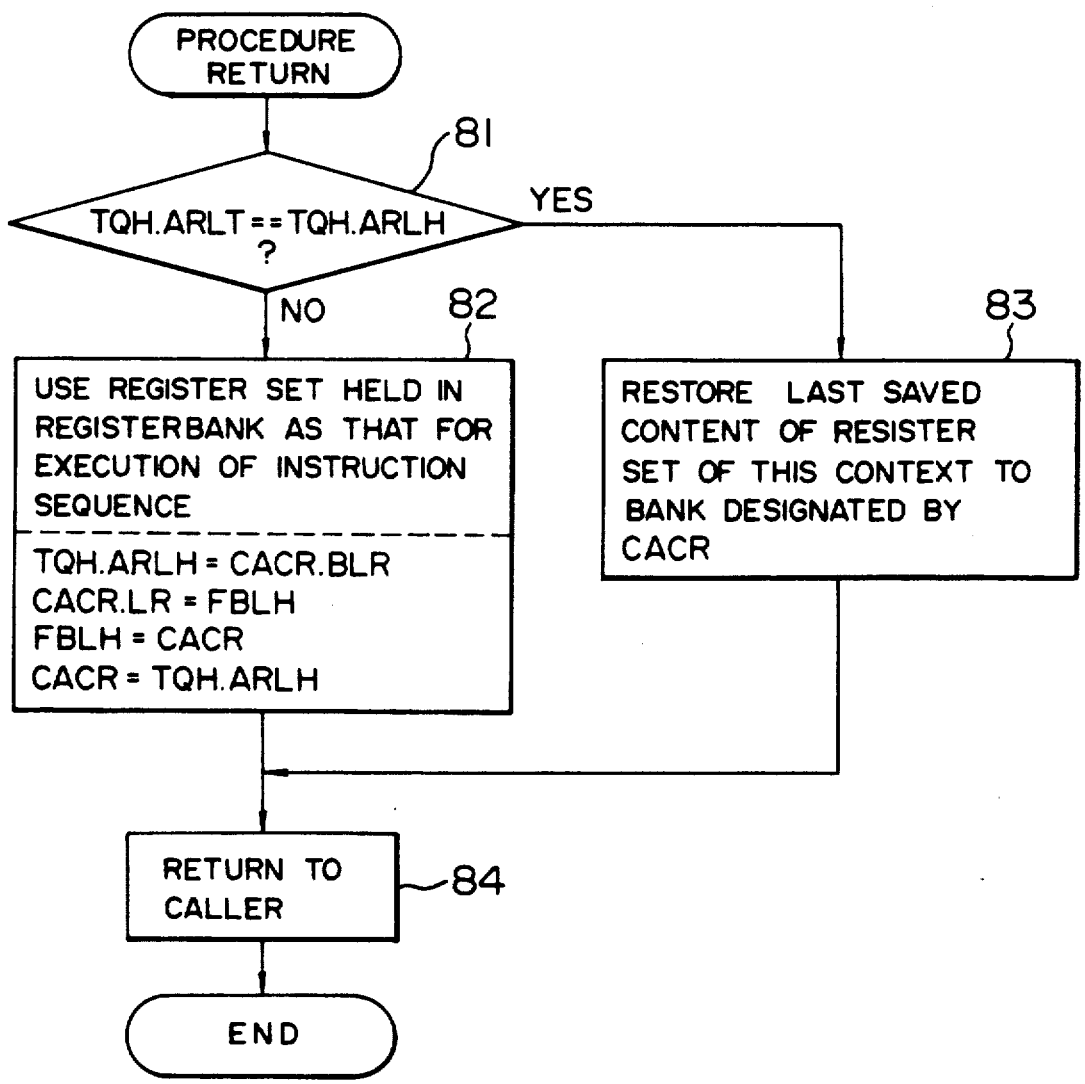
FIG. 8 is a flow chart showing the sequence of a procedure return process by the information processing apparatus of this invention.

FIG. 8 is a flow chart showing the sequence of a procedure return carried out by the embodiment of the information apparatus with a register file managed by dividing it into a plurality of register banks.

In accordance with an execution control signal generated by the instruction decode and execution control unit based on the sub-routine jump instruction read via the bus control unit, the following processes are performed.

First, it is checked if a register set for controlling the execution of an instruction train called by the procedure is present in the register bank, in accordance with TQH.ARLT= =TQH.ARLH ? (step 81). If NO, the register set is stored, and if YES, the register set is not stored.

If the register set is stored in the register bank, conducted is a process for using the stored register set as the register set for controlling the execution of an instruction set called the procedure (step 82).

If the register set is not stored in the register bank, it means that the register set for controlling the execution of an instruction set called the procedure was saved into the memory. Therefore, a process is conducted (step 83) wherein the saved data are restored in a register bank having stored a register set having controlled the execution of an instruction set, and the restored register set is used as the register set for controlling the execution of an instruction called the procedure.

Lastly, a sub-routine return instruction is processed in the similar manner as an ordinary information processing apparatus (step 84), and an execution of an instruction set called the procedure resumes.

According to the conventional technique, it is necessary for data saving and restoring to transfer data between the memory and register file during the procedure return process. However, according to this invention, the procedure return process can be realized only by the process associated with a register bank pointer such as managing the bank list according to which the register set is allocated, to thereby considerably improve the efficiency of the apparatus.

Figure 9:
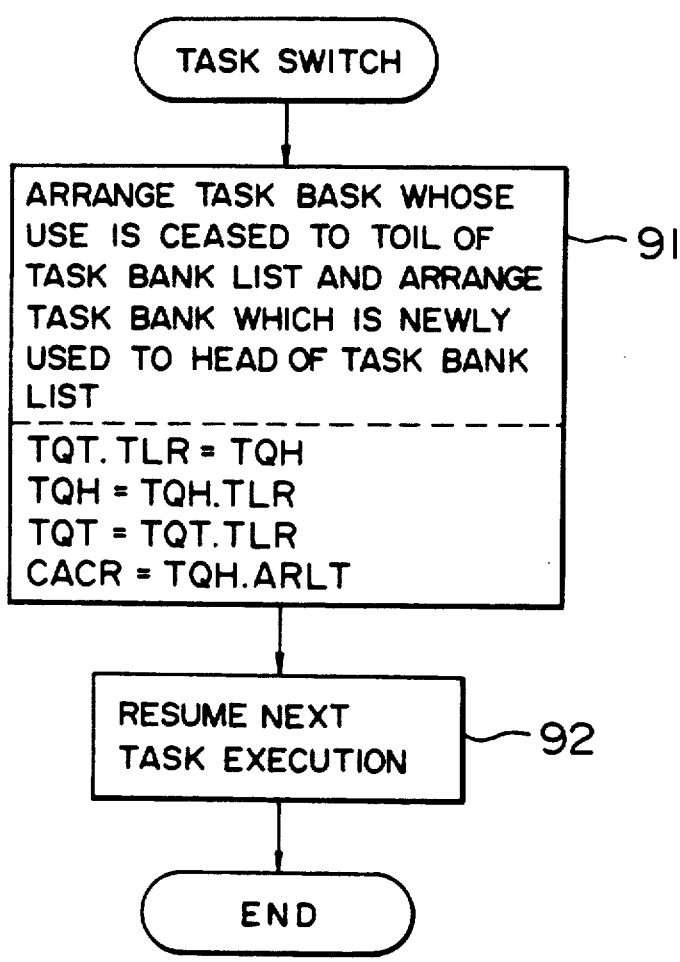
FIG. 9 is a flow chart showing the sequence of a task switch process by the information processing apparatus.

FIG. 9 is a flow chart showing the sequence of a task switch process carried out by the embodiment of the information apparatus with a register file managed by dividing it into a plurality of register banks.

This process includes a step 91 regarding a group of task banks and register sets, and a step 92 regarding resuming a task execution.

At the step 91 for the disposal of a group of task banks and register sets for controlling the newly executed task, the task bank having controlled the execution of a task is arranged to the tail of the task bank list, the task bank for controlling the newly executed task is arranged to the head of the task bank list, and the value of the bank pointer indicating the late generated register set among the register set group is set at the register CACR.

Next, at a step 82, a task switch process is conducted in the similar manner as an ordinary information processing apparatus.

According to the conventional technique, it is necessary for data saving and restoring to transfer data between the memory and register file during the task switch process. However, according to this invention, the task switch process can be realized only by the process associated with a register bank pointer such as managing the task bank list, to thereby considerably improve the efficiency of the apparatus.

What is claimed is:

1. An information processing apparatus comprising:
a main storage unit; and
an information processing unit for executing tasks;
wherein said information processing unit includes:
a register file having a plurality of register banks each having a plurality of registers,
free bank linking means for linking a plurality of free register banks one after another to form a free bank linked list having a head free register bank and a tail free register bank and setting a special identifier in said tail free register bank of the free bank linked list when the free bank linked list is changed, said free register banks being register banks which have not yet been used,
task linking means for linking register banks as task control banks one after another to form a task queue having a head task control bank and a tail task control bank, wherein each task control bank is allocated to one of a plurality of tasks to be executed by said information processing unit, pointer means for storing a free bank head pointer for pointing to said head free register bank of the free bank linked list, and task queue head and tail pointers for respectively pointing to said head and tail task control banks of the task queue, and record linking means, responsive to a procedure call from a currently executed task, for separating said tail free register bank from the free bank linked list, allocating said separated tail free register bank to an activation record for a called side of said procedure call as a record bank and linking an allocated record bank to a head portion of a task linked list corresponding to said currently executed task to update said task linked list, said task linked list including one of said task control banks and register banks for called sides of procedure calls already executed but not returned, and said one task control bank being linked to a head register bank of said task linked list.

2. An information processing apparatus according to claim 1, wherein said free register banks include free bank pointers, wherein said free register banks are linked through said free bank pointers and said free bank head pointer, and wherein said register banks of said task linked list include record bank pointers wherein said register banks of said task linked list are linked through said record bank pointers.

3. An information processing apparatus according to claim 1, further comprising:

means for, when the task to be executed is switched, changing linkage of the task queue in accordance with priorities of execution of the tasks.

4. An information processing apparatus according to claim 1, further comprising:

means for, when there is no free register banks, selecting one register bank from said task linked list, saving a content of the selected one register bank in the main storage unit, and causing the selected register bank to be linked as a free register bank by said free bank linking means.

5. An information processing apparatus according to claim 1, wherein each register bank of said task linked list has two pointers for bidirectionally linking said each register bank to another register bank, and said one task control bank has two pointers for pointing to head and tail record banks of the task linked list.

* * * * *